(12) United States Patent
Wright

(10) Patent No.: US 8,864,599 B2
(45) Date of Patent: Oct. 21, 2014

(54) TEACHING AID

(75) Inventor: David Wright, Belmont, MA (US)

(73) Assignee: Swing-Wright, LLC, Cary, NC (US)

( * ) Notice: Subject to any disclaimer, the term of this patent is extended or adjusted under 35 U.S.C. 154(b) by 539 days.

(21) Appl. No.: 13/184,760

(22) Filed: Jul. 18, 2011

(65) Prior Publication Data

US 2013/0023353 A1    Jan. 24, 2013

(51) Int. Cl.
| A63B 69/36 | (2006.01) |
| G09B 19/00 | (2006.01) |
| A63B 24/00 | (2006.01) |
| A63B 69/38 | (2006.01) |
| A63B 71/06 | (2006.01) |
| A63B 69/00 | (2006.01) |

(52) U.S. Cl.
CPC ......... *A63B 69/3614* (2013.01); *A63B 69/3635* (2013.01); *A63B 2220/18* (2013.01); *G09B 19/0038* (2013.01); *A63B 2071/0627* (2013.01); *A63B 2225/50* (2013.01); *A63B 24/0003* (2013.01); *A63B 69/3644* (2013.01); *A63B 2069/0008* (2013.01); *A63B 69/3632* (2013.01); *A63B 69/38* (2013.01); *A63B 2024/0012* (2013.01)
USPC .......................................... 473/224; 473/409

(58) Field of Classification Search
CPC ........... A63B 24/0003; A63B 69/3635; A63B 2024/0012; A63B 2024/0009; A63B 69/3614; A63B 69/3632; A63B 2071/0627; G09B 19/0038
USPC .................................................. 473/224, 409
See application file for complete search history.

(56) References Cited

U.S. PATENT DOCUMENTS

| 2,283,277 | A |   | 5/1942  | Modine          |          |
|-----------|---|---|---------|-----------------|----------|
| 2,695,165 | A | * | 11/1954 | Siegfried       | 73/514.19|
| 2,800,657 | A | * | 7/1957  | Weil et al.     | 343/756  |
| 2,888,256 | A | * | 5/1959  | Sedgfield       | 73/497   |
| 3,818,341 | A |   | 6/1974  | Burdick         |          |
| 3,831,086 | A | * | 8/1974  | Pesto           | 324/67   |
| 3,895,366 | A |   | 7/1975  | Morris          |          |
| 4,135,184 | A | * | 1/1979  | Pruzick         | 340/572.5|
| 4,243,980 | A | * | 1/1981  | Lichtblau       | 340/572.7|
| 4,742,356 | A |   | 5/1988  | Kuipers         |          |
| 4,991,850 | A | * | 2/1991  | Wilhlem         | 473/233  |
| 5,156,402 | A | * | 10/1992 | Hart            | 473/229  |
| 5,247,261 | A | * | 9/1993  | Gershenfeld     | 324/716  |
| 5,486,002 | A | * | 1/1996  | Witler et al.   | 473/199  |
| 5,846,086 | A | * | 12/1998 | Bizzi et al.    | 434/247  |
| 5,869,968 | A | * | 2/1999  | Brooks et al.   | 324/338  |
| 5,911,635 | A |   | 6/1999  | Ogden           |          |
| 5,935,014 | A | * | 8/1999  | Lindsay         | 473/222  |
| 5,935,061 | A | * | 8/1999  | Acker et al.    | 600/304  |
| 6,045,364 | A | * | 4/2000  | Dugan et al.    | 434/252  |
| 6,073,043 | A |   | 6/2000  | Schneider       |          |
| 6,148,280 | A | * | 11/2000 | Kramer          | 702/153  |
| 6,242,907 | B1|   | 6/2001  | Clymer et al.   |          |
| 6,261,189 | B1|   | 7/2001  | Saville et al.  |          |
| 6,912,475 | B2|   | 6/2005  | Moriya et al.   |          |
| 6,981,876 | B2|   | 1/2006  | Bleckley et al. |          |

(Continued)

OTHER PUBLICATIONS 112, 6th USPTO policy memo, Sep. 2, 2008.*

*Primary Examiner* — Michael Cuff
(74) *Attorney, Agent, or Firm* — Bachman & LaPointe, P.C.

(57) ABSTRACT

A system for improving a swing has a transmitter coil for creating an electromagnetic field aligned with respect to a desired swing plane of a sporting implement and a plurality of coils for detecting an actual swing plane relative to the desired swing plane.

19 Claims, 4 Drawing Sheets

(56) References Cited

U.S. PATENT DOCUMENTS

| | | |
|---|---|---|
| 7,015,859 B2 | 3/2006 | Anderson |
| 7,432,810 B2 * | 10/2008 | Menache et al. ............ 340/572.1 |
| 7,736,242 B2 | 6/2010 | Stites et al. |
| 7,789,742 B1 * | 9/2010 | Murdock et al. .................. 463/3 |
| 8,142,302 B2 * | 3/2012 | Balardeta et al. .............. 473/222 |
| 8,174,347 B2 * | 5/2012 | Fullerton et al. .............. 335/306 |
| 8,177,654 B2 * | 5/2012 | Pelz ............................ 473/220 |
| 8,292,753 B1 * | 10/2012 | Galloway ..................... 473/221 |
| 2004/0017313 A1 * | 1/2004 | Menache ...................... 342/465 |
| 2004/0159153 A1 * | 8/2004 | Dilz, Jr. ......................... 73/489 |
| 2006/0020003 A1 | 1/2006 | Commons et al. |
| 2006/0125691 A1 * | 6/2006 | Menache et al. .............. 342/450 |
| 2010/0267462 A1 * | 10/2010 | Mooney ....................... 473/269 |
| 2010/0271012 A1 | 10/2010 | Patterson et al. |
| 2011/0028231 A1 * | 2/2011 | Balardeta et al. .............. 473/223 |
| 2011/0031839 A1 * | 2/2011 | Fullerton et al. .............. 310/152 |
| 2011/0281621 A1 * | 11/2011 | Murdock et al. .................. 463/3 |
| 2012/0115626 A1 * | 5/2012 | Davenport ..................... 473/223 |

* cited by examiner

TEACHING AID

BACKGROUND

The present invention relates to a teaching aid for use by athletes to improve their swings, and in particular to a golf swing teaching aid.

A variety of teaching aids are used to improve swings in sports such as golf, tennis, and baseball. Currently, teaching aids include verbal feedback, video playback, and mechanical guides—all designed to help a player feel the appropriate swing plane. However, none of these aids provide real-time feedback during an unencumbered, real swing where the athlete is actually hitting a ball at a target, just as he would under real game conditions.

In the field of improving swings used by certain athletes, there remains a need for a teaching aid which provides real-time feedback.

Electromagnetic technology has been used in a wide variety of applications. Direction-specific electromagnetic fields are used in such applications as proximity sensors, magnetic media read-write, finding and discriminating unexploded ordnance from other buried metallic clutter.

In the unexploded ordnance application, an electromagnetic sensor comprised of a transmitter coil and a receiver coil are used. The transmitter coil emits a time varying electromagnetic field. When this electromagnetic field energizes a metal target, it induces secondary fields, which are sensed with the receiver part of the sensor. By energizing the target in different directions, then measuring the magnitude of the induced secondary field in three component axis, one is able to ascertain crude target shape and size estimates. The directional control and dimensionality of these primary electromagnetic fields are adapted in this invention to be used as a reference to define the proper swing plane.

SUMMARY OF THE INVENTION

In accordance with the present invention, there is provided a system for improving a swing, such as a golf swing, which broadly comprises means for transmitting an electromagnetic field aligned with respect to a desired swing plane of a sporting implement and means for detecting an actual swing plane relative to the desired swing plane.

Further in accordance with the present invention, there is provided a method for improving a swing which broadly comprises the steps of providing a sporting implement having a plurality of receiver coils in a butt end; generating an electromagnetic field normal to a desired swing plane for the sporting implement; sensing said electromagnetic field using said receiver coils during an actual swing of said sporting implement; measuring a signal sensed by an axially aligned one of said receiver coils; generating a ratio of the signal sensed by said axially aligned one of said receiver coils to a vector sum of signals sensed by remaining ones of said receiver coils; and generating a real-time, variable audio signal if the ratio exceeds a predetermined threshold.

Other details of the teaching aid of the present invention are set forth in the following detailed description and the accompanying drawings, wherein like reference numerals depict like elements.

DETAILED DESCRIPTION OF THE PREFERRED EMBODIMENT(S)

The present invention uses electromagnetic technology to provide real-time, bio-feedback as an athletic teaching aid. For example, the system of the present invention may be used to monitor and improve the swing plane of a golf swing, a tennis stroke, or a batting swing. For this application, electromagnetic sensor technology is used to measure the attitude of the club shaft relative to the desired swing plane.

Figure 1:
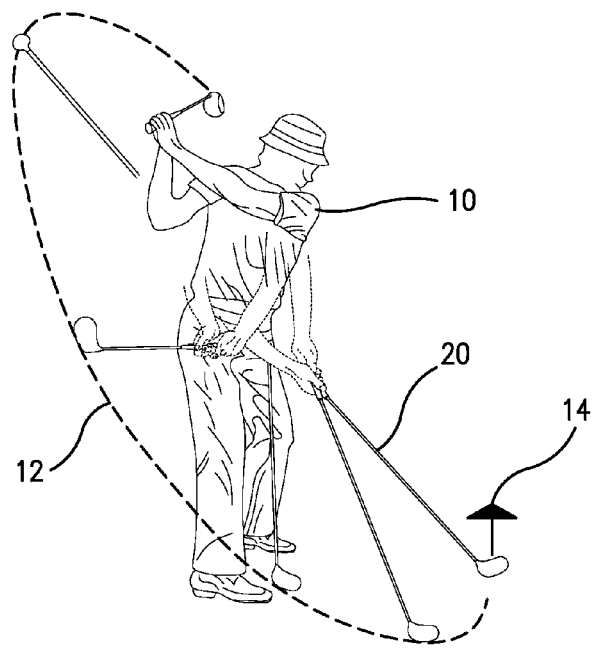
FIG. 1 is a schematic representation of a golf swing.

Referring now to FIG. 1, there is shown a golfer 10 and a typical swing plane 12 for a golf swing. The orientation of the swing plane 12 relative to a target 14 is a critical factor in the accuracy of the ball flight. In order to achieve proficiency, a golfer 10 must be able to align the swing plane 12 properly and consistently. Analysts frequently comment that a golfer 12 is getting stuck inside, or is cutting across his/her line. These are references to problems with the swing path, i.e. problems keeping the golf club on the proper swing plane. Problems with the golfer's actual swing plane are hard to self diagnose because the golfer's perception of the swing plane may not accurately represent his actual swing plane.

Figure 2:
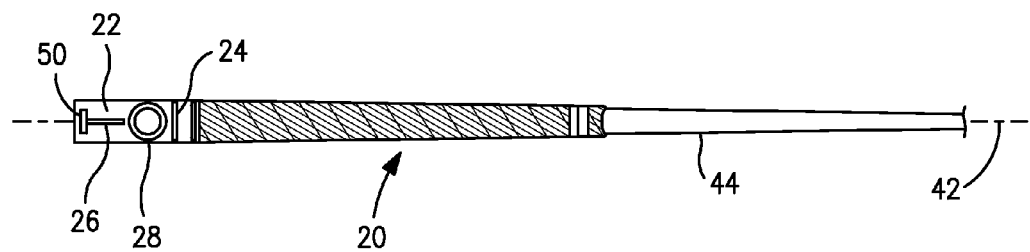
FIG. 2 is a schematic representation of a sporting implement equipped with receiving coils.

In adapting electromagnetic technology to measure club angle relative to the desired swing plane, it has been found that one can ignore secondary fields and simply use a set of receiver coils to measure the relationship of the golf club to the primary field. Referring now to FIG. 2, there is shown a sporting implement 20 which although shown as a golf club could be a tennis racket, a baseball bat, etc. The sporting implement 20 has a butt end 22. In accordance with a first embodiment, the teaching aid system of the present invention includes a plurality of receiver coils 24, 26, and 28 mounted in the butt end 22 of the sporting implement 20. The receiver coils 24, 26, and 28 in the butt end 22 include three orthogonal coils. The coils 24, 26, and 28 provide a way to measure the angle of the transmitted electromagnetic field relative to the sporting implement 20. In the case of a golf swing, this allows one to measure the attitude of the golf club 20 relative to the electromagnetic field. By doing this, one is able to use electromagnetic technology to provide real-time feedback of the angle of the club 20 relative to the desired swing path or plane.

Figure 6:
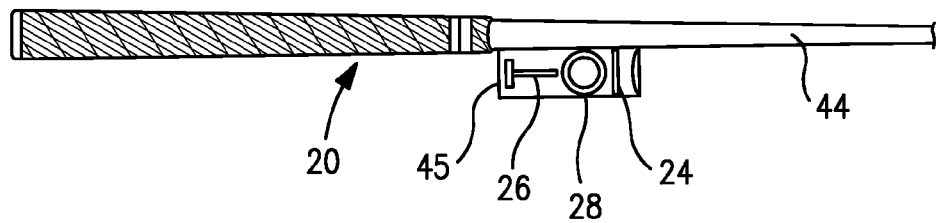
FIG. 6 is a schematic representation of a sporting implement equipped with receiving coils on a shaft.

While the coils 24, 26 and 28 are shown in FIG. 2 as being in the butt end 22, they may, as shown in FIG. 6, be located within a housing 45 on a shaft 44 of the implement 20.

The teaching aid system of the present invention further includes an electromagnetic transmitter 30 which generates an electromagnetic field that is normal, i.e. orthogonal, to the desired swing plane 12. The receiver coils 24, 26, and 28 mounted at the butt end 22 of the sporting implement 20 or in the shaft 44 are used to measure the angle of the electromagnetic field. From this, the orientation of the sporting implement 20 may be derived relative to this field. Having derived the orientation of the sporting implement 20 relative to the EM field and hence the swing plane, the information can be transmitted to the user in real-time during the swing.

Figure 3:
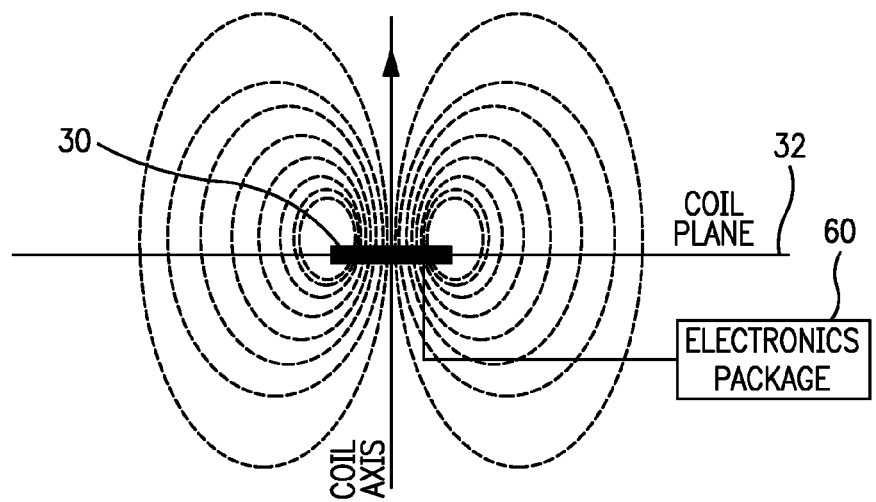
FIG. 3 illustrates an electromagnetic primary transmitted field.

FIG. 3 illustrates the basic components of the primary electromagnetic field. As a time varying current, i.e. a simple sine wave or more complex wave form, is applied to the transmitter coil 30, an electromagnetic field is generated. The direction and the strength of the electromagnetic field will vary with the wave form. Of interest is the fact that, at any position along the plane of the transmitter coil 30, the induced electromagnetic field is orthogonal to the plane of the transmitter coil 30. As a result, the electromagnetic field need not be particularly powerful or complex.

Figure 4:
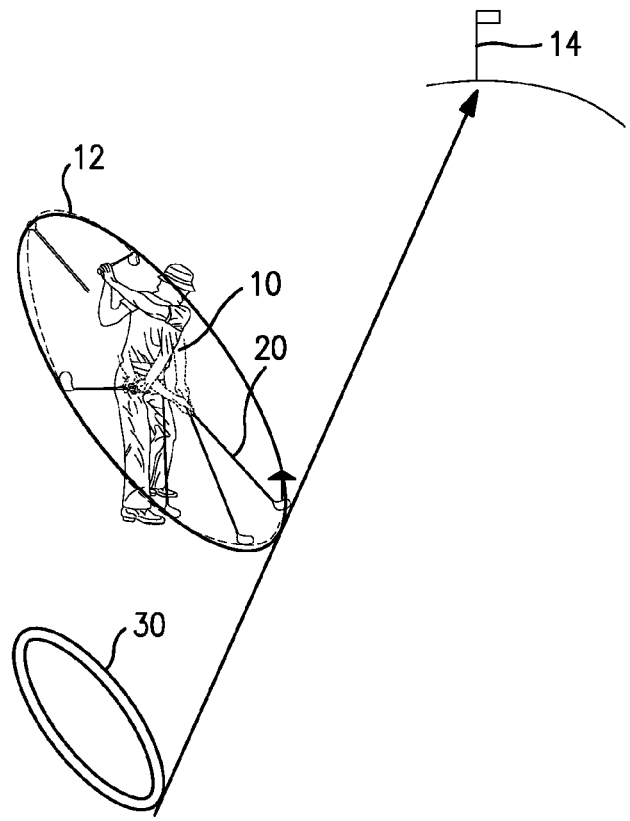
FIG. 4 illustrates a transmitter coil alignment with a desired swing plane.

In the teaching aid system of the present invention, the plane 32 of the transmitter coil 30 is aligned with the desired swing plane 12 as shown in FIG. 4. By providing such an arrangement, the longitudinal axis 42 of the sporting implement 20 is parallel to the plane 32 of the transmitter coil 30. For example in the case of a golf swing, during a properly executed golf swing, as the club 20 is swung along the plane 12, the longitudinal axis 42 of the golf club 20 will remain parallel to the transmitted field.

By mounting the three orthogonal receiver coils 24, 26, and 28 at the butt end 22 or on the shaft 44 of the sporting implement 20, one can measure the strength of the field and the ratio of the field encountered by each component coil 24, 26, and 28. A first one 24 of the coils is coaxially aligned with the shaft 44 of the sporting implement 20, i.e. the axis of the coil 24 is pointed down the shaft of the sporting implement 20. Through all phases of the swing, the coil 24 that is coaxially aligned with the shaft 44 of the golf club 20 will be minimally coupled to the electromagnetic field as long as the sporting implement 20 remains parallel to the plane 32 of the coil 30. This minimum coupling means that the signal sensed by the coil 24 will be at a minimum, relative to the total sensed field, i.e. the root sum of the field sensed by each component coil 24, 26, and 28. The ratio of the signal sensed by the coil 24, relative to the total received field is directly proportional to the deviation of the longitudinal axis 42 of the sporting implement 20 from the desired swing plane 12.

Information about the signal sensed by the coil 24 may be relayed to a device 50 for providing the athlete or golfer 10 with a detection signal that the swing plane is not what it should be. For example, the device 50 may be an audible device which is incorporated into the sporting implement 20. The information about the signal sensed by the coil 24 may be transmitted to the device 50 in any suitable manner. The device 50 on the implement 20 may be comprised of the three coils 24, 26 and 28 attached to preamplifiers attached to A/D converters and a micro-processor. The micro-processor may extract the magnitude of the signal of the transmit frequency using existing mathematical techniques. The micro-processor may also control a small speaker mounted on the device or alternately will send the data via wireless technology (e.g. Blue-Tooth) to a nearby device that can store the data and provide a visual display as well as drive the audio output from the device 50. In this way, real-time feedback may be provided to the athlete or golfer 10 during each unencumbered swing.

The transmitter coil 30 used in the teaching aid system may be circular or rectangular. Further, the transmitter coil 30 may be comprised of a wire conductor wrapped in a series of loops or turns and encased in epoxy. A transmitter electronic package 60 attached to the transmitter coil 30 may be a simple wave form generator designed to run a current through the transmitter coil 30 at a predetermined frequency. The mechanical structure of the transmitter coil 30 allows a precise alignment of the transmitter coil 30 and its transmitted field with relative ease.

There are two alignment variables that must be accounted for—namely, "aim" and "tilt." The "aim" of the transmitter coil 30 and its electromagnetic field refers to the direction that the transmitter coil 30 and the desired swing plane 12 is aimed. This is the tangent of the desired swing plane 12 at the point of impact. If the swing plane 12 was vertical, this would be very easy to set up. The flat plane of the transmitter coil 30 would point directly at the target. However, because the desired swing plane 12 is tilted, a mechanical guide may be used to ensure that the plane 32 of the transmitter coil 30 is properly aimed at the target 14. This guide may also have provision to set the swing plane to be slightly left or right of the target 14 to allow for the golfer's tendency to hit a draw or fade.

The "tilt" refers to the tilt angle of the field that corresponds directly to the sporting implement's 20 lie angle, i.e. the angle of the swing plane 12 relative to the vertical. This adjustment may be a manual adjustment that may need to be made for each club.

To obtain the proper tilt angle, one may use two transmitter coils 30, one vertical and one horizontal. The two coils may be used to control the tilt angle of the transmitted electromagnetic field.

As discussed hereinbefore, the receiver coils 24, 26, and 28 are located in the butt end 22 or on the shaft 44 of the sporting implement 20. As discussed above, the coils 24, 26, and 28 are used to sense the primary transmitted field. This field may vary considerably in amplitude as the sporting implement passes through the swing arc, e.g. the butt end 22 of the sporting implement 20 will have a swing radius of roughly one meter. The ratio of the coil responses will only vary with the angle of the sporting implement 20. The electronics package 60 will measure the transmitted signal sensed by each of the receiver coils 24, 26, and 28. As before, the coils 24, 26 and 28 are attached to preamplifiers attached to A/D converters and a micro-processor. The micro-processor will extract the magnitude of the signal of the transmit frequency using existing mathematical techniques and compare the sensed signal amplitude of the coaxial coil 24, i.e. the coil 24 that is coaxial to the longitudinal axis 42 of the sporting implement 20, to the vector sum of the signal amplitude of the two remaining receiver coils 26 and 28. This comparison will take the form of a ratio that will be indicative of the angle of the sporting implement shaft 44 relative to the desired swing plane angle.

An aural tone generated by the device 50 may be used to indicate when this ratio exceeds a predetermined threshold. The tone may be present in two pitches. One pitch may indicate when the club is inside/under the desired plane. The second pitch may indicate when the club is outside/over the desired plane. In both cases the volume of the tone will vary proportionally to the error in swing angle. Alternatively the pitch of the tone may vary proportionally to the error in swing angle.

While the teaching aid has been described in the context of a golf swing teaching aid, it should be apparent that the teaching aid described herein could be used for other applications. For example, it could be used to improve a tennis stroke or a baseball swing. For such applications, the orthogonal receiver coils 24, 26, and 28 could be mounted in the butt end of a tennis racket or a butt end of a baseball bat.

Figure 5:
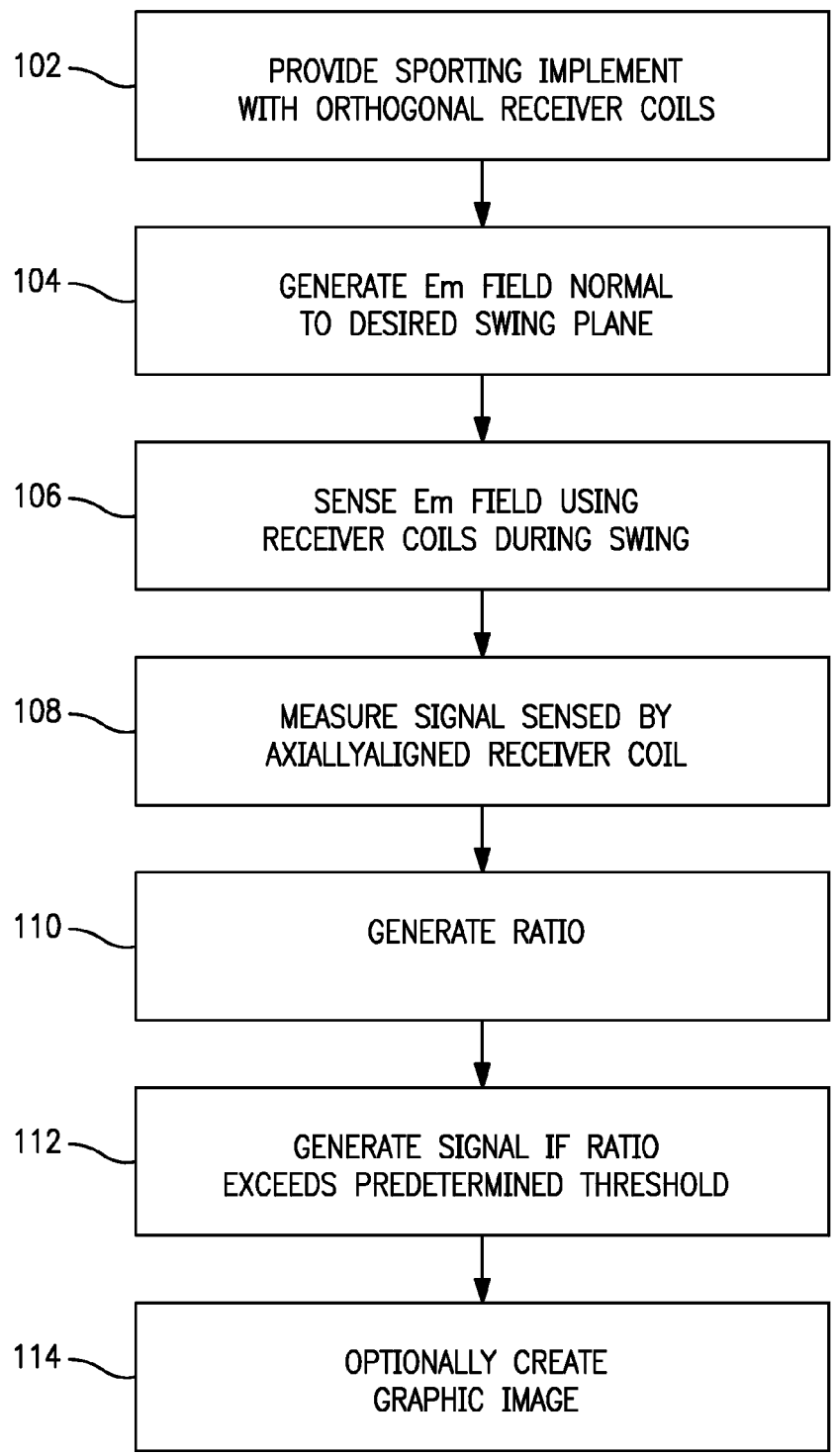
FIG. 5 is a schematic representation of a method of using the teaching aid system described herein.

Referring now to FIG. 5, there is shown the method of using the teaching aid. In step 102, there is provided a sporting implement 20, such as a golf club, having three orthogonal receiver coils 24, 26, and 28 in a butt end 22 or the shaft 44. In step 104, an electromagnetic (EM) field is generated normal to a desired swing plane 12. In step 106, the receiver coils 24, 26, and 28 sense the EM field as the user swings the sporting implement 20 in an unrestricted manner from start of the swing to the finish of the swing. In step 108, the signal sensed by the receiver coil 24 aligned with the shaft 44 of the sporting implement 20 is measured. In step 110, a ratio is generated by comparing the signal amplitude of the signal sensed by the receiver coil 24 to a vector sum of the amplitudes of the signals sensed by the receiver coils 26 and 28. In step 112, an aural tone is generated by the device 50 if the ratio exceeds a predetermined threshold.

As can be seen from the foregoing description, the user or athlete 10 is provided with real-time feedback that his/her actual swing plane is not aligned with a desired swing plane for the sporting implement.

If desired, in a step 114, one could use the signals generated by the receiver coils 24, 26, and 28 to recreate graphically on a display device such as a TV screen or a computer screen, a depiction of the athlete's actual swing plane vs. a desired swing plane. To do that, one can save the signals on a storage device associated with a preprogrammed computer and later generate a graphical image for the athlete 10.

There has been described herein a teaching aid. While the teaching aid has been described in the context of a specific embodiment thereof, other unforeseen alternatives, modifications, and variations may become apparent to those skilled in the art having read the foregoing description. Accordingly, it is intended to embrace those alternatives, modifications, and variations as fall within the broad scope of the appended claims.

What is claimed is:

1. A system for improving a swing comprising:
   means for transmitting an electromagnetic field aligned with respect to a desired swing plane of a sporting implement, wherein said transmitting means comprises a transmitting coil which is aligned with the desired swing plane,
   an electronics package attached to said transmitting coil; and
   means for detecting an actual swing plane relative to said desired swing plane, wherein said detecting means comprises three orthogonal coils and said electronics package measures the transmitter signal sensed by each of the coils and compares an amplitude of a signal generated by a first one of said coils having an axis pointed down a shaft of the sporting implement to a sum of a signal amplitude of a second and third ones of said coils and generates a signal in the form of a ratio indicative of an angle of the shaft of the sporting implement relative to the desired plane angle.

2. The system of claim 1, further comprising means for transmitting a signal to a user in real-time that the actual swing plane differs from the desired swing plane.

3. The system of claim 2, wherein said transmitting means comprises an aural tone device.

4. The system of claim 3, wherein said aural tone device generates a tone that increases as an angle of the sporting implement increases relative to the desired swing plane.

5. The system of claim 3, wherein said aural tone device generates a first pitch which indicates when the sporting implement is inside the desired swing plane and a second pitch when the sporting implement is outside the desired swing plane.

6. The system of claim 1, wherein said transmitting coil is circular.

7. The system of claim 1, wherein said transmitting coil is rectangular.

8. The system of claim 1, wherein said transmitting coil comprises a wire conductor wrapped in a series of turns and said wire conductor is encased in epoxy.

9. The system of claim 1, wherein said electronics package comprises a wave form generator.

10. The system of claim 1, further comprising means for generating an aural sound when said ratio exceeds a predetermined threshold.

11. The system of claim 1, wherein said sporting implement is a golf club.

12. The system of claim 1, wherein said sporting implement is a tennis racket.

13. The system of claim 1, wherein said sporting implement is a baseball bat.

14. A system for improving a swing comprising:
   a sporting implement having a butt end and a shaft;
   three orthogonal coils mounted to said shaft aligned with respect to a desired swing plane of said sporting implement;
   a transmitting coil which is aligned with the desired swing plane; and
   an electronics package attached to said transmitter coil.

15. The system of claim 14, wherein said orthogonal coils are mounted in said butt end.

16. The system of claim 14, wherein said orthogonal coils are mounted on said shaft.

17. The system of claim 14, wherein one of said orthogonal coils is aligned along a longitudinal axis of said sporting implement so that an axis of the one coil is pointed down a shaft of said sporting implement.

18. The system of claim 17, wherein said one coil is minimally coupled to said electromagnetic field when the sporting implement remains parallel to a plane of said transmitting coil.

19. The system of claim 17 further comprising means for determining the ratio of the signal sensed by the one coil relative a total received field.

* * * * *